United States Patent [19]

Peters et al.

[11] Patent Number: 4,837,299

[45] Date of Patent: Jun. 6, 1989

[54] PROCESS FOR MAKING POLYIMIDES

[75] Inventors: Edward N. Peters, Lenox; Michael W. Schultz, Pittsfield, both of Mass.

[73] Assignee: General Electric Company, Pittsfield, Mass.

[21] Appl. No.: 948,044

[22] Filed: Dec. 31, 1986

[51] Int. Cl.[4] ............................................. C08G 69/26
[52] U.S. Cl. .................................... 528/353; 528/26; 528/28; 528/125; 528/126; 528/128; 528/173; 528/179; 528/185; 528/351; 528/352
[58] Field of Search ............... 528/353, 352, 351, 128, 528/125, 126, 173, 179, 185, 28, 26

[56] References Cited

U.S. PATENT DOCUMENTS

| | | | |
|---|---|---|---|
| 3,342,774 | 9/1967 | Hoegger | 528/172 |
| 3,803,085 | 4/1974 | Takekoshi et al. | 260/46.5 E |
| 3,833,544 | 9/1974 | Takekoshi et al. | 260/47 CB |
| 3,847,867 | 11/1974 | Heath et al. | 260/47 CP |
| 3,905,942 | 9/1975 | Takekoshi et al. | 260/47 CP |
| 3,991,004 | 11/1976 | Takekoshi et al. | 260/37 N |
| 3,998,840 | 12/1976 | Williams et al. | 260/326 N |
| 4,011,198 | 3/1977 | Takekoshi et al. | 260/47 CP |
| 4,073,773 | 2/1978 | Banucci et al. | 260/47 CP |
| 4,098,800 | 7/1978 | Banucci et al. | 260/346.3 |
| 4,197,396 | 4/1980 | Banucci et al. | 528/208 |
| 4,221,897 | 9/1980 | Takekoshi et al. | 528/125 |
| 4,324,882 | 4/1982 | Takekoshi | 528/206 |
| 4,417,044 | 11/1983 | Parekh | 528/179 |

FOREIGN PATENT DOCUMENTS

| | | |
|---|---|---|
| 1595105 | 3/1970 | Fed. Rep. of Germany . |
| 1901292 | 4/1970 | Fed. Rep. of Germany . |
| 3526010 | 1/1986 | Fed. Rep. of Germany . |

*Primary Examiner*—John Kight
*Assistant Examiner*—M. L. Moore
*Attorney, Agent, or Firm*—Bernard, Rothwell & Brown

[57] ABSTRACT

A process for making thermoplastic polyimides which involves reacting an aromatic dianhydride with an organic diamine in the presence of a tertiary amine in an inert solvent to form a polyamide acid salt; separating the polyamide acid salt from the solvent; and heating the polyamide acid salt under imidization conditions to form the desired polyimide.

20 Claims, No Drawings

PROCESS FOR MAKING POLYIMIDES

BACKGROUND OF THE INVENTION

The present invention relates to a process for making polyimides, and in particular to a process for making polyetherimides. The polyimides which are produced by the process of this invention are high performance engineering thermoplastics. These polymers are characterized by superior physical and chemical properties, such as high heat resistance, high impact and flexural strengths, and excellent processibility. Many of these polymers possess the physical characteristics of thermoset resins, yet can be molded conveniently by injection molding techniques.

Several processes for making polyimides are known. Typically, these polymers are prepared by reacting an organic diamine with an aromatic dianhydride. Two processes which have been of particular interest are the "melt polymerization" process and the "solution polymerization" process. The melt polymerization process has been described in several United States patents, representative of which is U.S. Pat. No. 3,803,085 by T. Takekoshi and J. Kochanowski. This process involves combining an aromatic bis(ether anhydride) and an organic diamine and heating the mixture under an inert atmosphere to form a homogeneous melt. Water formed during the polymerization reaction is removed at a temperature of up to 350° C. In a preferred embodiment of the process, the final stage of the reaction is conducted under reduced pressure to facilitate removal of water. The melt polymerization procedure has been improved by employing certain catalysts to enhance yields or reaction rates. (For example, see Takekoshi et al., U.S. Pat. No. 3,833,544, Williams et al., U.S. Pat. No. 3,998,840 and Takekoshi, U.S. Pat. No. 4,324,822). The melt polymerization process has been adapted to the continuous mode by conducting the reaction in extrusion apparatus, as described, for example, by Takekoshi et al., U.S. Pat. No. 4,011,198 and Banucci, et al., U.S. Pat. No. 4,073,773.

Solution polymerization is generally conducted by reacting an aromatic dianhydride and an organic diamine in an inert solvent at temperatures up to about 200° C. In this procedure, water evolved during the reaction may be removed by azeotropic distillation. The resulting polymer is generally recovered by mixing the reaction solution with a precipitant, such as methanol. The reaction solvents employed for solution polymerization are selected for their solvent properties and their compatibility with the reactants and products. High-boiling, non-polar, organic solvents are preferred. (E.g., see Takekoshi et al., U.S. Pat. No. 3,991,004.) Dipolar, aprotic solvents and phenolic solvents can also be used, particularly when an aromatic bis(ether dicarboxylic acid) is used in place of the dianhydride as the starting material. (E.g., see Takekoshi et al., U.S. Pat. No. 3,905,942.)

D. Heath and J. Wirth (U.S. Pat. No. 3,847,867) disclose a method for preparing polyetherimides which involves stirring a solution of an aromatic bis(ether anhydride) and an organic diamine in a dipolar, aprotic solvent under ambient conditions to produce a polyamide acid, casting the polyamide acid solution on a substrate to facilitate the removal of organic solvent, and then heating the substrate in a stepwise manner to 200°–300° C. to complete the conversion of the polyamide acid to the polyetherimide.

S. L. Parekh (U.S. Pat. No. 4,417,044) discloses a process for making polyetherimides which involves reacting an aromatic bis(ether anhydride) with an organic diamine in an inert solvent to form a prepolymer solution, forming a thin film of the prepolymer solution to evaporate the solvent, and then heating the prepolymer to a temperature above the glass transition temperature of the final product to form the desired polyetherimide.

The use of the foregoing procedures for the preparation of certain high performance polymers has sometimes met with certain disadvantages. There is an increasing interest in developing injection moldable polyimides suitable for very high-temperature applications and having increased chemical resistance, as compared to the polyetherimides described in the above-cited patents. In general, these polyimides are crystalline or semi-crystalline homopolymers or copolymers prepared from aromatic dianhydrides and diamines containing rigid, linear monocyclic or polycyclic aromatic groups.

These crystalline and semi-crystalline polymers are highly insoluble in organic solvents. Moreover, when they are produced by first isolating the polyamide acid intermediate, it has been found that a substantial amount of the unreacted diamine is bound to the polyamide acid through relatively labile ionic bonds. When these materials are extruded at elevated temperatures, the ionic bonds are brokent and a significant amount of the diamine is lost through volatilization. The volatilization not only makes controlling the stoichiometry difficult, but also poses a significant health hazard since the diamine is lost to the atmosphere and condenses on surrounding surfaces.

Takekoshi (U.S. Pat. No. 4,221,897) describes reacting an aromatic dianhydride and an organic diamine in an aqueous reaction medium substantially devoid of organic solvent. The reaction produces a polyamide acid intermediate which is recovered as a finely divided powder which can be used to make high molecular weight polyimide by melt extrusion. In a similar process, Banucci et al. describe, in U.S. Pat. Nos. 4,098,800 and 4,197,396, a process which involves reacting an aromatic dianhydride and an organic diamine in an inert liquid selected from methylene chloride, chloroform, 1,2-dichloroethane and mixtures thereof with acetone. The reaction produces an oligomeric polyamide acid which is substantially insoluble in the organic liquid and thus separates from the reaction mixture as a precipitate. The polyamide acid may be recovered in powdered form, which is useful in powder coating procedures wherein the desired polyetherimide is obtained in in situ by heating it to a temperature above the glass transition temperature.

The melt polymerization procedures are attended by the disadvantages of complexity of operation, relatively high equipment costs and thermal limitations. Accordingly, a need exists for a simple procedure for preparing polyimides, particularly crystalline and semi-crystalline polyimides, which can be conducted in low-cost conventional equipment.

SUMMARY OF THE INVENTION

In accordance with the present invention, a novel process for making polyimides involves the steps of:

(a) reacting an aromatic dianhydride with a substantially equimolar amount of an organic diamine in the presence of a tertiary amine in an inert solvent to form a polyamide acid salt-solvent mixture, (b) separating the polyamide acid salt from the polyamide acid salt-solvent mixture; and (c) heating the polyamide acid salt under imidization conditions to form the desired polyimide.

DETAILED DESCRIPTION OF THE INVENTION

The polyimides prepared by the process of this invention may be depicted by the formula,

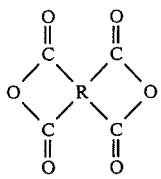

wherein R and $R^2$ are as hereinafter defined. The first step in the present process involves reacting an aromatic dianhydride of the formula

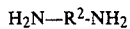

with a substantially equimolar amount of an organic diamine of the formula $H_2N-R^2-NH_2$ in the presence of a tertiary amine in an inert solvent. In the foregoing formula, R represents a tetravalent aromatic radical selected from the group consisting of

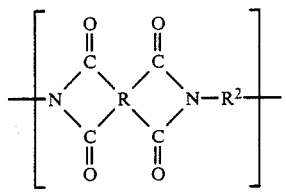

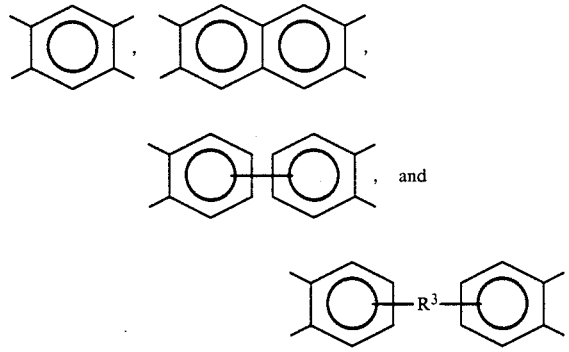

wherein $R^3$ is a member selected from the group consisting of —O—, —S—, —CO—, —$SO_2$—, $C_{(1-5)}$ alkylene and halogenated derivatives thereof, including perfluoroalkylene groups, and divalent radicals of the formula —O—Z—O—, wherein Z is a member selected from the group consisting of (A) divalent organic radicals of the formula:

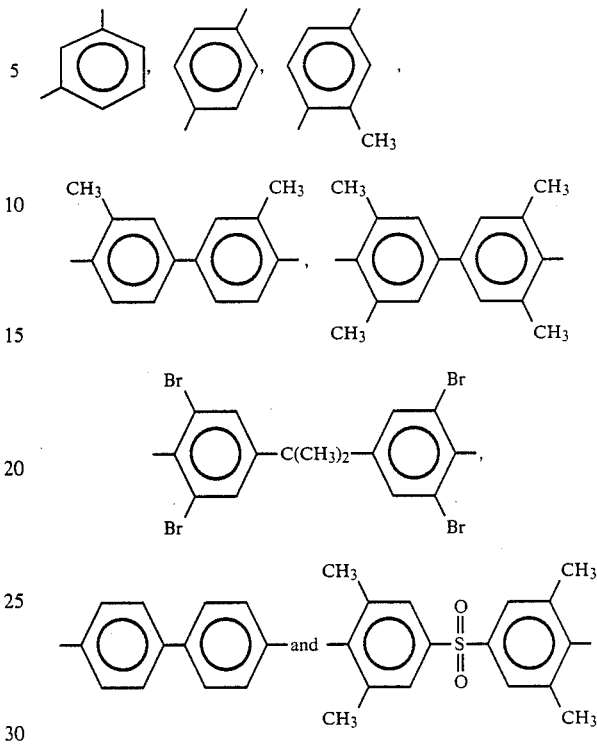

and (B) divalent organic radicals of the general formula

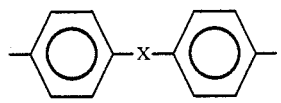

where X is a member selected from the group consisting of —O—, —S—, —CO—, —$SO_2$—, and $C_{(1-5)}$alkylene and halogenated derivatives, including perfluoroalkylene groups.

The tertiary amine may be any non-reactive tertiary amine which has a stronger basicity than the organic diamine. By "non-reactive," it is meant that the tertiary amine does not contain functional groups which react with the aromatic dianhydride or the organic diamine. Examples of such tertiary amines include tri(lower alkyl)amines, such as those containing from about 4 to about 20, preferably from about 6 to about 10 carbon atoms, di(lower alkyl)aryl amines, such as those in which the alkyl portion contains from about 2 to about 15, preferably from about 2 to about 10 carbon atoms and the aryl group contains from about 6 to about 10 carbon atoms, and N-(lower alkyl)heterocyclicamines containing from about 5 to about 20 carbon atoms, preferably from about 6 to about 10 carbon atoms. Exemplary tertiary amines are triethylamine, tripropylamine, methylethylamine, methyldiethylamine, tributylamine, trioctylamine, dimethylbenzylamine, N,N-diethylaniline, N,N-diethyltoluidine, N-methylpiperidine, N-methylpyrrolidine and the like. The foregoing list is by no means exhaustive, and numerous other examples will occur to those skilled in the art.

The reaction of the aromatic dianhydride and the organic diamine is believed to proceed through a polyamide acid intermediate. As the polyamide acid intermediate is formed, the tertiary amine forms ionic bonds with free carboxylic acid groups, thus preventing unreacted organic diamine from being tied up in the salt form. The resulting polyamide acid salt contains repeating units of the formula

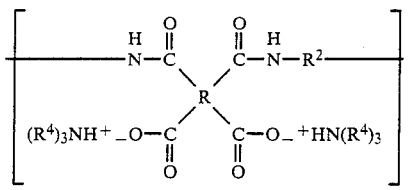

where the $R^4$ radicals are the organic groups of the tertiary amine.

The tertiary amine is employed in an amount sufficient to prevent substantial amounts of the unreacted organic diamine being ionically bound to polyamide acid. In general, the molar ratio of tertiary amine to the aromatic dianhydride ranges from about 0.2:1 to about 5:1, preferably from about 0.7:1 to about 2:1.

The reaction between the aromatic dianhydride and the organic diamine is conducted in an inert organic solvent. By "inert," it is meant that the solvent does not deleteriously react with reactants or products or otherwise interfere with the eaction. Polar, aprotic solvents are preferred, and advantageously, the solvent has a relatively low boiling point to facilitate its removal by distillation. Examples of such solvents include 1,2-dichloroethane, methylene chloride, chloroform, 2-pentanone, 2-butanone, tetrahydrofuran and diethylether.

The concentration of the reactants in the reaction solvent may vary over a fairly wide range. In general, the concentrations are high enough to maintain an efficient rate of reaction yet low enough to provide a fluid reaction medium. Typically aromatic dianhydride concentrations range from about 0.1 to about 0.8 moles per liter, preferably from about 0.2 to about 0.5 moles per liter. As indicated above, the organic diamine is employed in an amount substantially equimolar to the aromatic dianhydride, e.g., from about 0.8:1 to about 1.2:1, preferably from about 0.9:1 to about 1.1:1 on a molar basis.

If desired, a chain terminator may be employed to control the molecular weight of the polymer. The chain terminator is advantageously added to the aromatic dianhydride-lower aliphatic alcohol mixture, such that the molar ratio of aromatic dianhydride to chain terminator ranges from about 20:1 to about 200:1, preferably from about 25:1 to about 100:1. The chain terminator is preferably a reactive aromatic monoanhydride such as phthalic anhydride or a monofunctional aromatic amine, such as aniline.

$R^2$ may be a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, (c) $C_{(2-8)}$ alkylene terminated polydiorganosiloxanes, and (d) divalent radicals of the general formula

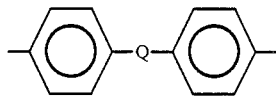

where Q is a member selected from the group consisting of $-O-$, $-S-$, $-CO-$, $-SO_2-$ and $C_{(1-5)}$ alkylene.

The reaction is conducted under polyamide acid-forming conditions. Such conditions include a temperature from about $-40°$ C. to about 100° C., preferably from about 0° C. to about 50° C. The reaction is allowed to proceed until a substantial amount, advantageously about all of the aromatic dianhydride and the organic diamine have reacted. The reaction time may vary considerably, depending upon the particular reactants, solvent, reactant concentrations and the like. In general, the reaction is permitted to proceed for about 15 to about 120 minutes, preferably from about 30 to about 60 minutes.

Any order of addition of the reactants may be employed. Preferably, the organic diamine and the tertiary amine are dissolved in a portion of the inert solvent, and the resulting solution is gradually added to a solution of the aromatic dianhydride.

Following reaction of the aromatic dianhydride and the organic diamine, the polyamide acid salt is recovered from the reaction mixture as a solid. Such recovery may be effected by a variety of techniques. If the polyamide acid salt precipitates from the reaction mixture, it may simply be recovered by filtration or centrifugation. A particularly preferred recovery procedure involves distillaton of the reaction solvent to cause precipitation of the polyamide acid salt.

The solid polyamide acid salt may be converted to the desired polyimide by heating it under imidization conditions. Such conditions include a temperature sufficiently high to effect the imidization reaction. In general, the temperature ranges from about 150° C. to about 350° C. Preferrably the imidization reaction is conducted in the solid state. Thus, the solid polyamide acid salt is advantageously heated to temperature which is high enough to effect the imidization reaction yet which is below the glass transition temperature of the polyamide acid salt and the final polyimide product. By maintaining the imidization temperature below the glass transition temperatures, the particulate form of the polyamide acid salt is maintained in the final product. This form of the product is particularly advantageous because it allows the product to be packaged in bags or drums and easily loaded into hoppers of extrusion and injection molding apparatus.

The imidazation conditions also preferably include heating the polyamide acid salt under a blanket of inert gas, such as dry nitrogen gas, to prevent deleterious oxidation reactions. The imidization is advantageously conducted under reduced pressure to facilitate volatilization of the tertiary amine and water formed as a result of the imidization reaction.

The process of this invention is generally applicable to the preparation of thermoplastic polyimides, and is particularly suited to the preparation of high temperature thermoplastic polyimides whose preparation by melt polymerization techniques may pose difficulties. Such high temperature polyimides include crystalline or semi-crystalline polymers prepared from dianhydrides and diamines having substantially linear, rigid structures. Examples of such dianhydrides are pyromellitic dianhydride, 4,4'-bis(dicarboxyphenoxy)biphenyl, 4,4'-bis(dicarboxyphenyl)diphenylether, and the like. When such dianhydrides are employed, they are preferably used in combination with bis(ether anhydrides) having more flexible, non-linear groups in their structures, so as to produce an injection moldable polymer having the desired physical and chemical properties. Examples of diamines that may be used to increase temperature and chemical resistance of polyimides include 4,4'-diaminodiphenyl ether, 4,4'-diaminobenzophenones and the like. Because of the high processing temperatures of polyimides derived from these types of dianhydrides and diamines, they have presented difficulties in their manufacture by melt polymerization procedures. In particular, the high processing temperatures make it difficult to control stoichiometries because of loss of reactants through volatilization.

The present invention is further illustrated by the following examples which are not intended to be limiting.

EXAMPLE A

This example illustrates a procedure for making a polyetherimide using no tertiary amine, and thus serves as a control for subsequent examples.

Into a 500 ml four-necked flask equipped with a nitrogen inlet, additional funnel and mechanical stirrer, 26.02 grams (0.050 moles) of 2,2-bis(3,4-dicarboxyphenoxyphenyl)propane dianhydride ("BPA-DA") were dissolved in 150 ml dry methylene chloride. To this solution were added 5.41 grams (0.050 moles) m-phenylene diamine dissolved in 50 ml dry methylene chloride. After a mild exotherm, the mixture was stirred for 30 minutes. The resin was isolated as a solid by evaporation of the solvent.

The resin was heated as a solid at 190° C. for 2 and 3 hours, and the intrinsic viscosities were determined. The results appear in Table I below.

EXAMPLE 1

Into a 500 ml four-necked flask equipped with a nitrogen inlet, addition funnel and mechanical stirrer, 26.02 grams (0.050 moles) BPA-DA were dissolved in 150 ml dry methylene chloride. To this solution were added 5.41 grams (0.050 moles) m-phenylene diamine dissolved in 50 ml dry methylene chloride and 1.81 grams (0.018 moles) triethylamine. After a mild exotherm, the mixture was stirred for 30 minutes. the resin was isolated as a solid by evaporation of the solvent.

The resin was heated as a solid at 190° C. for 2 and 3 hours and the intrinsic viscosities were determined. The results appear in Table I.

EXAMPLE 2

Into a 500 ml four-necked flask equipped with a nitrogen inlet, addition funnel and mechanical stirrer, 26.02 grams (0.050 moles) BPA-DA were dissolved in 150 ml dry methylene chloride. To this solution were added 5.41 grams (0.050 moles) m-phenylene diamine dissolved in 50 ml dry methylene chloride and 3.63 grams (0.036 moles) triethylamine. After a mild exotherm, the mixture was stirred for 30 minutes. The resin was isolated as a solid by evaporation of the solvent.

The resin was heated as a solid at 190° C. for 2 and 3 hours, and the intrinsic viscosities were determined. The results appear in Table I.

EXAMPLE 3

Into a 500 ml four-necked flask equipped with a nitrogen inlet, addition funnel and mechanical stirrer, 26.02 grams (0.050 moles) BPA-DA were dissolved in 150 ml dry methylene chloride. To this solution were added 5.41 grams (0.050 moles) m-phenylene diamine dissolved in 50 ml dry methylene chloride and 5.44 grams (0.054 moles) triethylamine. After a mild exotherm, the mixture was stirred for 30 minutes. The resin was isolated as a solid by evaporation of the solvent.

The resin was heated as a solid at 190° C. for 2 and 3 hours and the intrinsic viscosities were determined. The results appear in Table I.

EXAMPLE 4

Into a 500 ml four-necked flask equipped with a nitrogen inlet, addition funnel and mechanical stirrer, 26.02 grams (0.050 moles) BPA-DA were dissolved in 150 ml dry methylene chloride. To this solution were added 5.41 grams (0.050 moles) m-phenylene diamine dissolved in 50 ml dry methylene chloride and 7.26 grams (0.072 moles) triethylamine. After a mild exotherm, the mixture was stirred for 30 minutes. The resin was isolated as a solid by evaporation of the solvent.

The resin was heated as a solid at 190° C. for 2 and 3 hours, and the intrinic visocities were determined. The results appear in Table I.

EXAMPLE 5

Into a 500 ml four-necked flask equipped with a nitrogen inlet, addition funnel and mechanical stirrer, 26.02 grams (0.050 moles) BPA-DA were dissolved in 150 ml dry methylene chloride. To this solution were added 5.41 grams (0.050 moles) m-phenylene diamine dissolved in 50 ml dry methylene chloride and 10.12 grams (0.100 moles) triethylamine. After a mild exotherm, the mixture was stirred for 30 minutes. The resin was isolated as a solid by evaporation of the solvent.

The resin was heated as a solid at 190° C. for 2 and 3 hours, and the intrinsic visocities were determined. The results appear in Table I.

EXAMPLE 6

Into a 500 ml four-necked flask equipped with a nitrogen inlet, addition funnel and mechanical stirrer, 20.00 grams (0.0384 moles) BPA-DA were dissolved in 150 ml dry methylene chloride. To this solution were added 4.15 grams (0.0384 moles) m-phenylene diamine dissolved in 50 ml dry methylene chloride and 5.02 grams (0.0576 moles) N,N-diethymethylamine. After a mild exotherm, the mixture was stirred for 60 minutes. The resin was isolated as a solid by evaporation of the solvent.

The resin was heated as a solid at 190° C. for 3 hours. The intrinsic visocity of the resultant polymer was 0.87 dl/g as measured in chloroform.

EXAMPLE 7

Into a 500 ml four-necked flask equipped with a nitrogen inlet, addition funnel and mechanical stirrer, 20.00 grams (0.0384 moles) BPA-DA were dissolved in 150 ml dry methylene chloride. To this solution were added 4.15 grams (0.0384 moles) m-phenylene diamine dissolved in 50 ml dry methylene chloride and 7.79 grams (0.0576 moles) N,N-diethylmethylamine. After a mild exotherm, the mixture was stirred for 60 minutes. The resin was isolated as a solid by evaporation of the solvent.

The resin was heated as a solid at 190° C. for 3 hours. The intrinsic visocity of the resultant polymer was 0.94 dl/g as measured in chloroform.

EXAMPLE 8

Into a 500 ml four-necked flask equipped with a nitrogen inlet, addition funnel and mechanical stirrer, 20.00 grams (0.0384 moles) BPA-DA were dissolved in 150 ml dry methylene chloride. To this solution were added 4.15 grams (0.0384 moles) m-phenylene diamine dissolved in 50 ml dry methylene chloride and 3.09 grams (0.0422 moles) N,N-diethylmethylamine. After a mild exotherm, the mixture was stirred for 60 minutes. The resin was isolated as a solid by evaporation of the solvent.

The resin was heated as a solid at 190° C. for 3 hours. The intrinsic visocity of the resultant polymer was 0.52 dl/g as measured in chloroform.

EXAMPLE 9

Into a 500 ml four-necked flask equipped with a nitrogen inlet, addition funnel and mechanical stirrer, 25.00 grams (0.048 moles) BPA-DA were dissolved in 150 ml dry methylene chloride. To this solution were added 5.19 grams (0.048 moles) m-phenylene diamine dissolved in 50 ml dry methylene chloride and 5.95 grams (0.060 moles) 1-methyl piperidine. After a mild exotherm, the mixture was stirred for 60 minutes. The resin was isolated as a solid by evaporation of the solvent.

The resin was heated as a solid at 190° C. for 3 hours. The intrinsic visocity of the resultant polymer was 0.68 dl/g as measured in chloroform.

EXAMPLE 10

Into a 500 ml four-necked flask equipped with a nitrogen inlet, addition funnel and mechanical stirrer, 25.00 grams (0.048 moles) BPA-DA were dissolved in 150 ml dry methylene chloride. To this solution were added 5.19 grams (0.048 moles) m-phenylene diamine dissolved in 50 ml dry ethyl acetate and 10.32 grams (0.072 moles) tripropylamine. After a mild exotherm, the mixture was stirred for 60 minutes. The resin was isolated as a solid by evaporation of the solvent.

The resin was heated as a solid at 190° C. for 3 hours. The intrinsic visocity of the resultant polymer was 0.72 dl/g as measured in chloroform.

EXAMPLE 11

Into a 500 ml four-necked flask equipped with a nitrogen inlet, addition funnel and mechanical stirrer, 28.00 grams (0.0538 moles) BPA-DA were dissolved in 150 ml dry 2-butanone. To this solution were added 5.82 grams (0.0538 moles) m-phenylene diamine dissolved in 50 ml dry 2-butanone and 9.53 grams (0.094 moles) triethylamine. After a mild exotherm, the mixture was stirred for 60 minutes. The resin was isolated as a solid by evaporation of the solvent.

The resin was heated as a solid at 200° C. for 2 hours. The intrinsic viscosity of the resultant polymer was 0.75 dl/g as measured in chloroform.

EXAMPLE 12

Into a 500 ml four-necked flask equipped with a nitrogen inlet, addition funnel and mechanical stirrer, were charged 14.39 grams (0.0276 moles) BPA-DA and 2.51 grams (0.0115 moles) pyromellitic dianhydride and 120 ml methylene chloride. To this solution were added 4.12 grams (0.038 moles) m-phenylene diamine dissolved in 50 ml dry methylene chloride and 7.76 grams (0.0767 moles) triethylamine. After a mild exotherm, the mixture was stirrred for 60 minutes. The resin was isolated as a solid by evaporation of the solvent.

The resin was heated as a solid at 200° C. for 4 hours. The intrinsic viscosity of the resultant polymer was 0.65 dl/g as measured in phenol/1,1,2,2-tetrachloroethane ("TCE"). This material exhibited a glass transition temperature of 240° C.

EXAMPLE 13

Into a 2000 ml four-necked flask equipped with a nitrogen inlet, addition funnel and mechanical stirrer, were charged 95.18 grams (0.183 moles) BPA-DA and 750 ml methylene chloride. To this solution were added 24.72 grams (0.229 moles) m-phenylene diamine dissolved in 250 ml dry methylene chloride and 46.48 grams (0.460 moles) triethylamine. After a mild exotherm, 0.060 grams (0.00405 moles) of phthalic anhydride was added. After stirring for ten minutes, 9.54 grams (0.0437 moles) pyromellitic dianhydride was added. The solution was stirred for an additional 60 minutes. The resin was isolated as a solid by evaporation of the solvent. It exhibited an intrinsic viscosity of 0.11 dl/g in phenol/TCE. This resin was heated as a solid at 200° C. for 5 hours. The intrinsic viscosity of the resultant polymer was 0.76 dl/g as measured in phenol/TCE. This material was compression molded at 300° C. and the following properties obtained:

| | |
|---|---|
| HDT at 264 psi | 219° C. (426° F.) |
| Flex. Modulus, psi | 440,000 |
| Flex. Strength, psi | 20,000 |
| Tensile Modulus, psi | 470,000 |
| Notched Izod, ft-lbs/in | 0.6 |
| UL 94 (1/32") | V—O |
| Oxygen Index | — |
| Hardness, Rockwell | M115 |
| $M_w$ | 62,400 |
| $M_n$ | 22,200 |

TABLE I

| Example | Mole % Tertiary amine | I.V. (Polymer)dl/g[a] after 2 Hrs[b] | after 3 hrs[b] |
|---|---|---|---|
| A | — | 0.22 | 0.24 |
| 1 | 36 | 0.29 | 0.32 |
| 2 | 72 | 0.32 | 0.34 |
| 3 | 108 | 0.40 | 0.49 |
| 4 | 144 | 0.92 | 0.98 |
| 5 | 200 | 0.95 | 1.03 |

[a]in phenol/TCE
[b]at 190° C.

We claim:

1. A process for making a polyimide having repeating units of the formula

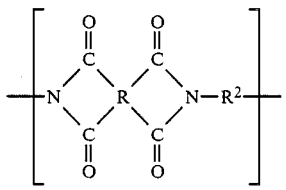

which comprises the steps of:
(a) reacting an aromatic dianhydride of the formula

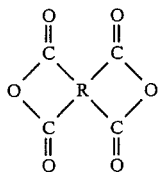

with a substantially equimolar amount of an organic diamine of the formula

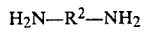

$H_2N-R^2-NH_2$ in an inert solvent containing a tertiary amine selected from the group consisting of tri(lower alkyl)amines containing from about 4 to about 20 carbon atoms, di(lower alkyl)arylamines, wherein the alkyl portion contains from 2 to about 15 carbon atoms and the aryl portion contains from 6 to about 10 carbon atoms, and N-(lower alkyl)heterocyclic amines containing from 5 to about 20 carbon atoms, said tertiary amine being present in an amount sufficient to prevent substantial amounts of the unreacted organic diamine from ionically binding to the polyamide acid, said reaction thereby forming a polyamide acid salt-solvent mixture;
(b) separating the polyamide acid-salt from the polyamide acid salt-solvent mixture; and
(c) heating the polyamide acid salt under imidization conditions to form the desired polyimide; wherein R is a tetravalent aromatic radical selected from the group consisting of

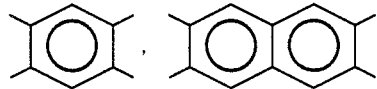

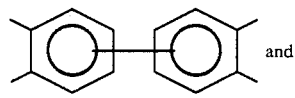

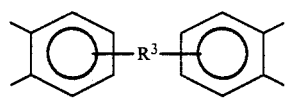

wherein $R^3$ is a member selected from the group consisting of —CO—, —SO$_2$—, C$_{(1-5)}$ alkylene and halogenated derivatives thereof, including perfluoroalkylene and divalent radicals of the formula

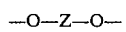

—O—Z—O— wherein Z is a member selected from the group consisting of (A) divalent organic radicals of the formula:

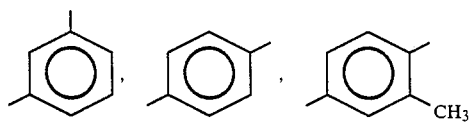

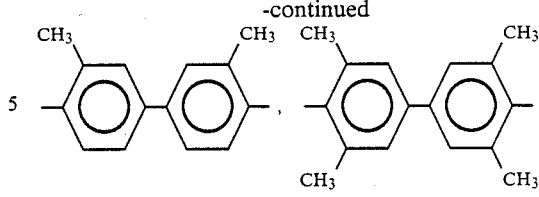

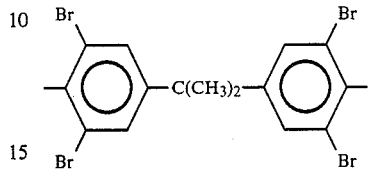

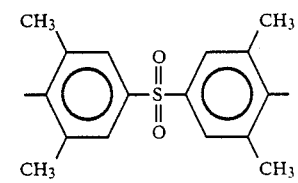

and (B) divalent organic radicals of the general formula

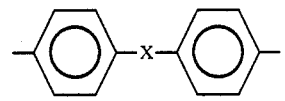

where X is a member selected from the group consisting of —O—, —S—, —CO—, —SO$_2$—, and C$_{(1-5)}$ alkylene and halogenated derivatives thereof; and $R^2$ is a divalent organic radical selected from the group consisting of (a) aromatic hydrocarbon radicals having from 6 to about 20 carbon atoms and halogenated derivatives thereof (b) alkylene radicals having from 2 to about 20 carbon atoms, cycloalkylene radicals having from 3 to about 20 carbon atoms, (c) from C$_2$ to about C$_8$ alkylene terminated polydiorganosiloxane, and (d) divalent radicals of the general formula

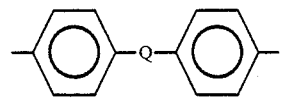

where Q is a member selected from the group consisting of:

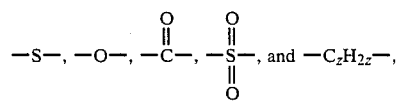

and z is an integer from 1 to about 5.

2. The process of claim 1, wherein R is a tetravalent aromatic radical of the formula,

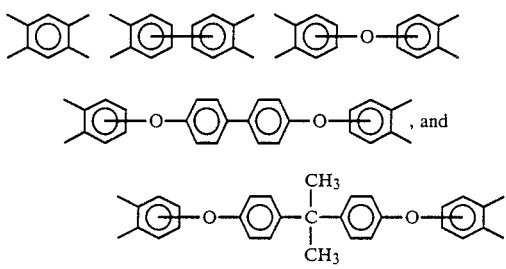

3. The process of claim 1, wherein R² is a member selected from the group consisting of o-phenylenediamine, m-phenylenediamine and p-phenylenediamine.

4. The process of claim 1, wherein the aromatic dianhydride has the formula

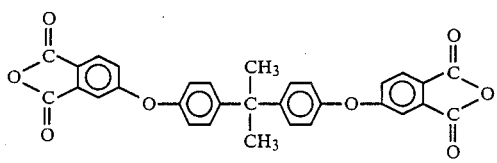

5. The process of claim 1, wherein the aromatic dianhydride has the formula

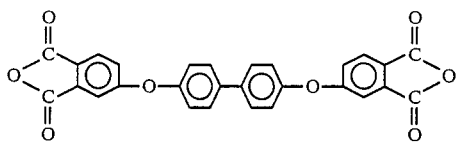

6. The process of claim 1, wherein the bis(ether anhydride) has the formula

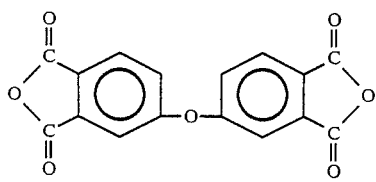

7. The process of claim 1, wherein a mixture of aromatic dianhydrides is employed for making the polyimide.

8. The process of claim 1, 2, 3 or 4 wherein the tertiary amine is employed in an amount sufficient to prevent substantial amounts of the unreacted organic diamine being ionically bound to the polyamide acid.

9. The process of claim 8, wherein the molar ratio of the tertiary amine to the aromatic dianhydride ranges from about 0.2:1 to about 5:1.

10. The process of claim 8, wherein the molar ratio of the tertiary amine to the aromatic dianhydride ranges from about 0.7:1 to about 2:1.

11. The process of claim 8, wherein the tertiary amine is a tri(lower alkyl)amine containing from about 4 to about 20 carbon atoms, a di(lower alkyl)arylamine wherein the alkyl portion contains from 2 to about 15 carbon atoms and the aryl portion contains from 6 to about 10 carbon atoms, or an N-(lower alkyl)heterocyclic amine containing from 5 to about 20 carbon atoms.

12. The process of claim 8, wherein the tertiary amine is a tri(lower alkyl)amine containing from about 6 to about 10 carbon atoms, a di(lower alkyl)arylamine wherein the alkyl portion contains from about 2 to about 10 carbon atoms and the aryl portion contains from about 6 to about 10 carbon atoms, or an N-(lower alkyl)heterocyclic amine containing from 6 to about 10 carbon atoms.

13. The process of claim 8, wherein the tertiary amine is selected from the group consisting of triethylamine, tripropylamine, dimethylethylamine, methyldiethylamine, tributylamine, trioctylamine, dimethylbenzylamine, N,N-diethylaniline, N,N-diethyltoluidine, and N-methylpiperidine.

14. The process of claim 8, wherein the reaction of step (a) is conducted at a temperature of from about −40° C. to about 100° C.

15. The process of claim 14, wherein the reaction of step (a) is conducted at a temperature of from about 0° C. to about 50° C.

16. The process of claim 1, wherein step (a) further comprises adding an effective amount of a chain-terminating agent.

17. The process of claim 1, wherein the imidization conditions in step (c) include a temperature of from about 150° C. to about 350° C.

18. The process of claim 17, wherein the imidization conditions in step (c) include a temperature of from about 150° C. up to about the glass transistion temperature of the polyimide being formed.

19. A polyamide acid salt having repeating units of the formula

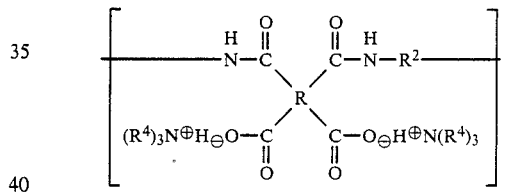

wherein R is a tetravalent aromatic radical selected from the group consisting of

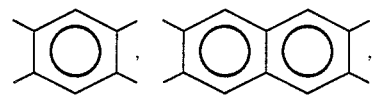

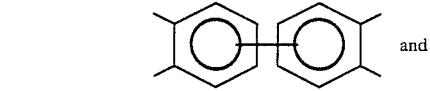

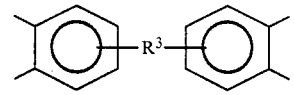

wherein R³ is a member selected from the group consisting of —O—, —S—, —CO—, —SO₂—, and C₍₁₋₅₎ alkylene and halogenated derivatives thereof and divalent radicals of the formula

—O—Z—O— wherein Z is a member selected from the group consisting of (A) divalent organic radicals of the formula:

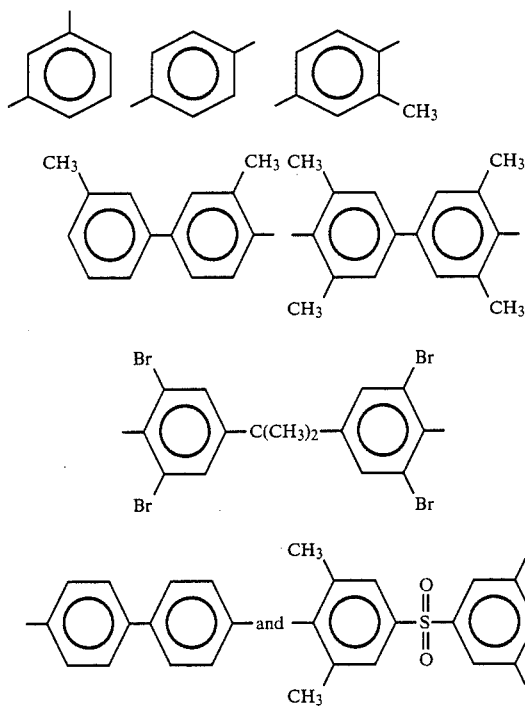

and (B) divalent organic radicals of the general formula

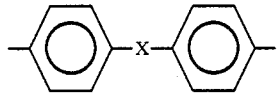

where X is a member selected from the group consisting of divalent radicals of the formula —O—, —S—, —CO—, —SO$_2$— and C$_{(1-5)}$ alkylene and halogenated derivatives thereof:

and R$^2$ is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, (c) from C$_2$ to about C$_8$ alkylene terminated polydiorganosiloxane, and (d) divalent radicals of the general formula

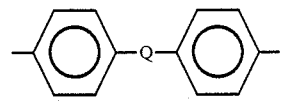

where Q is a member selected from the group consisting of:

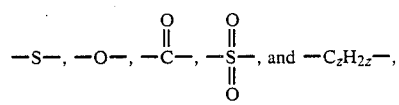

and z is an integer from 1 to about 5; and (R$^4$)$_3$N represents a tri(lower alkyl)amine containing from about 4 to about 20 carbon atoms, a di(lower alkyl)arylamine wherein the alkyl portion contains from 2 to about 15 carbon atoms and the aryl portion contains from 6 to about 10 carbon atoms, or an N-(lower alkyl)heterocyclic amine containing from 5 to about 20 carbon atoms.

20. The polyamide acid salt of claim 19, wherein (R$^4$)$_3$N represents a tri(lower alkyl)amine containing from about 6 to about 10 carbon atoms, a di(lower alkyl)arylamine wherein the alkyl portion contains from about 2 to about 10 carbon atoms and the aryl portion contains from about 6 to about 10 carbon atoms, or an N-(lower alkyl)heterocyclic amine containing from 6 to about 10 carbon atoms.

* * * * *